United States Patent
Cloud et al.

(10) Patent No.: US 11,248,676 B2
(45) Date of Patent: Feb. 15, 2022

(54) VIBRATION DAMPER

(71) Applicants: Randy Gene Cloud, Mentor, OH (US); Ashley Elizabeth Briskey, Cleveland Heights, OH (US); Jessica Brooke Dalton, Wadsworth, OH (US); Samuel David Intihar, Chesterland, OH (US); Darnell Deshaun Johnson, Willoughby Hills, OH (US)

(72) Inventors: Randy Gene Cloud, Mentor, OH (US); Ashley Elizabeth Briskey, Cleveland Heights, OH (US); Jessica Brooke Dalton, Wadsworth, OH (US); Samuel David Intihar, Chesterland, OH (US); Darnell Deshaun Johnson, Willoughby Hills, OH (US)

(73) Assignee: Preformed Line Products Co., Mayfield Village, OH (US)

( * ) Notice: Subject to any disclaimer, the term of this patent is extended or adjusted under 35 U.S.C. 154(b) by 0 days.

(21) Appl. No.: 16/003,069

(22) Filed: Jun. 7, 2018

(65) Prior Publication Data
US 2019/0376575 A1    Dec. 12, 2019

(51) Int. Cl.
*F16F 7/104* (2006.01)

(52) U.S. Cl.
CPC .................. *F16F 7/104* (2013.01)

(58) Field of Classification Search
CPC .. F16F 15/02; F16F 7/14; F16F 7/1005; F16F 7/104; F16F 7/116; E01D 19/16; H02G 7/14
See application file for complete search history.

(56) References Cited

U.S. PATENT DOCUMENTS

| | | | | | |
|---|---|---|---|---|---|
| 1,842,809 A | * | 1/1932 | Varney | ...... | H02G 7/14 248/63 |
| 2,005,882 A | * | 6/1935 | Arnold | ...... | H02G 7/053 248/63 |
| 2,058,174 A | * | 10/1936 | Monroe | ...... | H02G 7/14 248/63 |
| 2,081,974 A | * | 6/1937 | Arnold | ...... | H02G 7/14 248/74.1 |
| 2,374,823 A | * | 5/1945 | Leib | ...... | H02G 7/14 174/42 |

(Continued)

FOREIGN PATENT DOCUMENTS

| CH | 123400 A | 11/1927 |
|---|---|---|
| DE | 554712 C | 7/1932 |

(Continued)

OTHER PUBLICATIONS

Corresponding International Patent Application No. PCT/US2019/035920, International Search Report and Written Opinion, dated Aug. 30, 2019.

*Primary Examiner* — Robert A. Siconolfi
*Assistant Examiner* — Mahbubur Rashid
(74) *Attorney, Agent, or Firm* — Cooper Legal Group, LLC (57) ABSTRACT

A vibration damper for reducing a vibration in a cable is provided. The vibration damper includes an attachment portion that is attached to the cable. The vibration damper includes a flexible leg portion attached to the attachment portion. The vibration damper includes a weighted portion attached to the flexible leg portion. The weighted portion is spaced a distance apart from the attachment portion.

20 Claims, 8 Drawing Sheets

(56) References Cited

U.S. PATENT DOCUMENTS

| | | | | |
|---|---|---|---|---|
| 2,688,047 A * | 8/1954 | Macintyre | H02G 7/14 | 174/42 |
| 2,969,416 A * | 1/1961 | Mcgavern | H02G 7/14 | 174/42 |
| 3,048,649 A * | 8/1962 | Mcgavern | H02G 7/14 | 174/42 |
| 3,068,314 A * | 12/1962 | Dalmasso | H02G 7/14 | 174/42 |
| 3,073,887 A * | 1/1963 | Mcgavern | F16F 7/108 | 174/42 |
| 3,128,330 A * | 4/1964 | Grasser | H02G 7/14 | 174/42 |
| 3,260,789 A * | 7/1966 | Edwards | H02G 7/14 | 174/42 |
| 3,327,048 A * | 6/1967 | Petter | H02G 7/14 | 174/42 |
| 3,400,209 A * | 9/1968 | Toshikazu | H02G 7/14 | 174/42 |
| 3,446,907 A * | 5/1969 | Bouche | G01M 7/00 | 174/42 |
| 3,711,624 A * | 1/1973 | Dulhunty | H02G 7/14 | 174/42 |
| 3,784,137 A * | 1/1974 | Eddens | H02G 7/053 | 248/63 |
| 3,906,143 A * | 9/1975 | Leblanc | H02G 7/125 | 174/42 |
| 3,941,914 A * | 3/1976 | Oishi | H02G 7/14 | 174/42 |
| 4,140,868 A * | 2/1979 | Tuttle | H02G 7/14 | 174/42 |
| 4,159,393 A * | 6/1979 | Dulhunty | H02G 7/14 | 174/42 |
| 4,167,646 A * | 9/1979 | Mathieu | H02G 7/14 | 174/42 |
| 4,259,541 A * | 3/1981 | Bouche | H02G 7/14 | 174/42 |
| 4,385,201 A * | 5/1983 | Nigol | H02G 7/14 | 174/42 |
| 4,397,069 A * | 8/1983 | Camossi | B21F 3/04 | 140/92.2 |
| 4,527,009 A * | 7/1985 | Hawkins | H02G 7/14 | 174/42 |
| 4,620,060 A * | 10/1986 | Perinetti | H02G 7/14 | 174/42 |
| 6,469,246 B1 | 10/2002 | Van Dyke et al. | | |
| 6,715,176 B2 * | 4/2004 | Stubler | E01D 19/16 | 14/18 |
| 6,774,303 B1 * | 8/2004 | Brittain | H02G 7/14 | 174/40 R |
| 7,569,769 B2 | 8/2009 | Zaleski et al. | | |
| 9,800,039 B2 | 10/2017 | Quesnel | | |
| 9,948,081 B1 * | 4/2018 | Barry | H02G 7/053 | |
| 10,193,319 B2 | 1/2019 | Barry et al. | | |
| 2008/0236856 A1 * | 10/2008 | Zaleski | H02G 7/14 | 174/42 |
| 2015/0014904 A1 * | 1/2015 | Tirelli | E01D 19/16 | 267/140.2 |

FOREIGN PATENT DOCUMENTS

| | | | | |
|---|---|---|---|---|
| DE | 1921172 A1 | 1/1971 | | |
| EP | 0236248 A1 * | 9/1987 | | F16F 7/104 |
| EP | 1315263 A1 * | 5/2003 | | H02G 7/14 |
| FR | 2358041 A1 | 2/1978 | | |
| GB | 946852 A * | 1/1964 | | F16F 7/108 |

* cited by examiner

VIBRATION DAMPER

TECHNICAL FIELD

The instant application is generally directed towards a vibration damper. For example, the instant application is directed towards a vibration damper for reducing a vibration in a cable.

BACKGROUND

Vibration dampers may be used for reducing vibrations of a cable. Vibration dampers may be attached to a cable.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a vibration damper for reducing a vibration of a cable is provided. The vibration damper comprises an attachment portion configured to be attached to the cable. A flexible leg portion is attached to the attachment portion. A weighted portion is attached to the flexible leg portion. The weighted portion is spaced a distance apart from the attachment portion.

In an example, a vibration damper for reducing a vibration of a cable is provided. The vibration damper comprises an attachment portion configured to be attached to the cable. A flexible leg portion is attached to the attachment portion. A weighted portion is attached to the flexible leg portion. The weighted portion is spaced a distance apart from the attachment portion. A second flexible leg portion is attached to the weighted portion. The second flexible leg portion is spaced a second distance apart from the flexible leg portion. A second weighted portion is attached to the second flexible leg portion. The second weighted portion is spaced a third distance apart from the weighted portion.

In an example, a vibration damper for reducing a vibration of a cable is provided. The vibration damper comprises an attachment portion configured to be attached to the cable. A flexible leg portion is attached to a first side of the attachment portion. A third flexible leg portion is attached to a second side of the attachment portion. A weighted portion is attached to the flexible leg portion. The weighted portion is spaced a distance apart from the attachment portion. A third weighted portion is attached to the third flexible leg portion. The third weighted portion is spaced a third distance apart from the attachment portion.

The following description and annexed drawings set forth certain illustrative aspects and implementations. These are indicative of but a few of the various ways in which one or more aspects can be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter.

Figure 1:
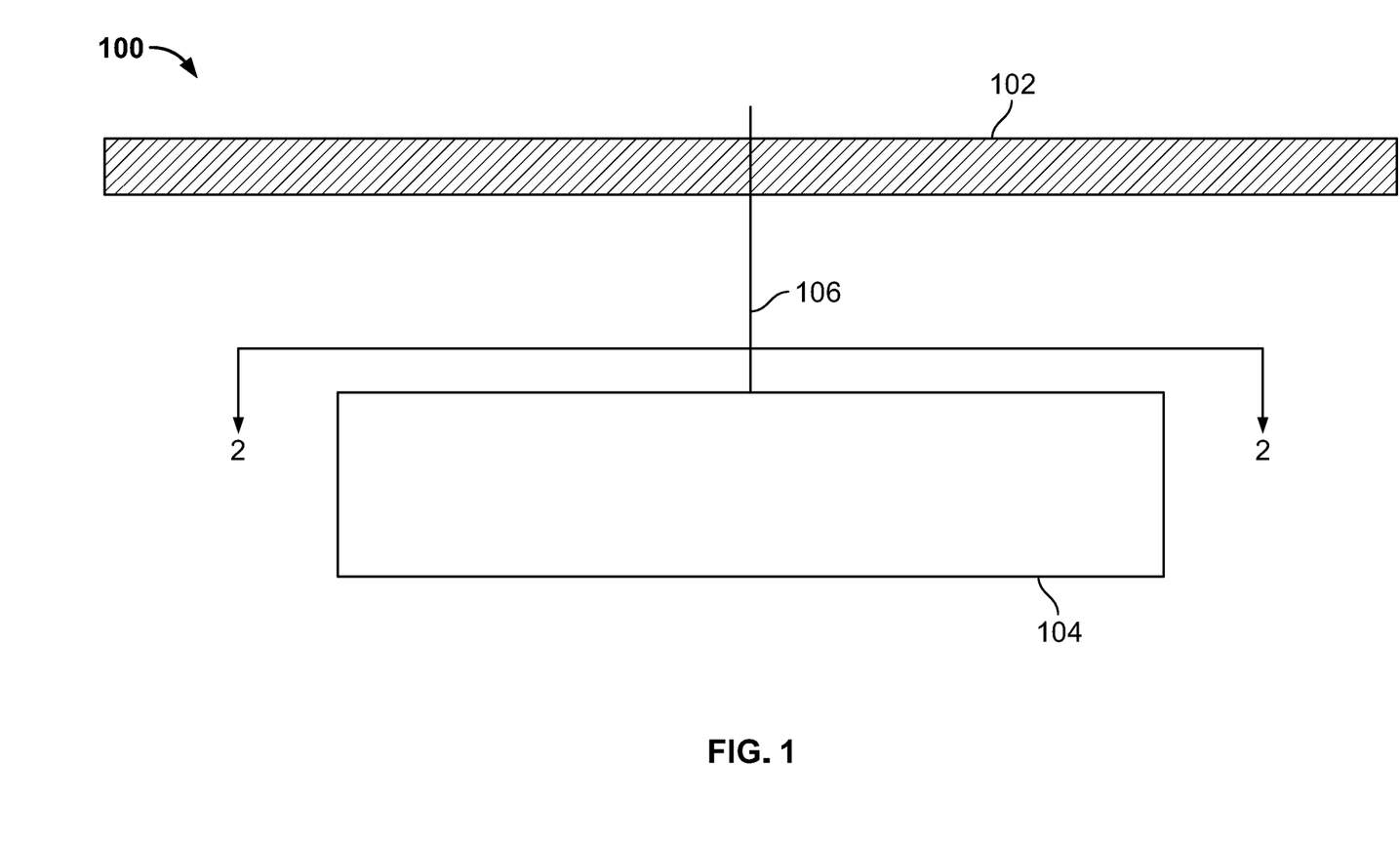
FIG. 1 illustrates an example damper system.

Turning to FIG. 1, an example damper system 100 is illustrated. In an example, the damper system 100 comprises a cable 102 that may be an electrically conductive or non-conductive wire, cable, line, rope, fiber, fiber optic, etc. The cable 102 may include any number of materials including metal materials (e.g., conductors), non-metal materials (plastics, composite materials, etc.), or the like, that may or may not be implemented to provide utility services and/or products. The cable 102 can support one or more structures, such as robots, vibration dampers, etc. in an example, a goal of the damper system 100 may be to reduce and/or attenuate unwanted vibrations of the cable 102. The cable 102 may vibrate due to environmental effects such as wind, precipitation, etc., or from objects/animals contacting the cable 102.

The damper system 100 comprises a vibration damper 104. In an example, the vibration damper 104 can be attached to the cable 102 by an attachment structure 106. The attachment structure 106 may comprise a hook, clamping mechanism, or other types of mechanical fasteners that function to attach the vibration damper 104 to the cable 102. In this way, the vibration damper 104 may be secured to the cable 102 and limited from being inadvertently detached and/or separated from the cable 102. As will be described herein, the vibration damper 104 can reduce and/or attenuate vibrations that are experienced by the cable 102.

Figure 2:
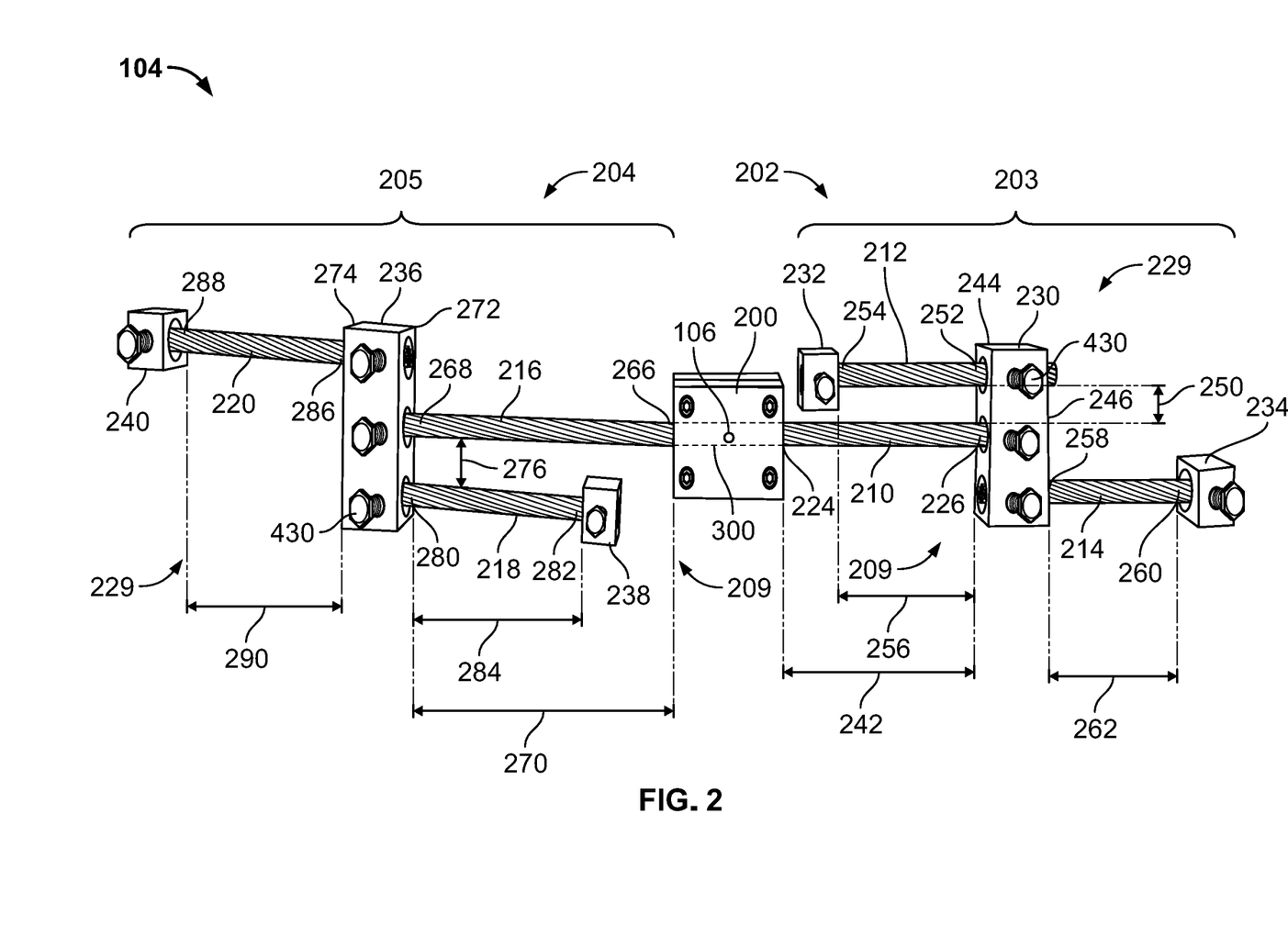
FIG. 2 illustrates an example damper system.

Referring to FIG. 2, a top down view of the vibration damper 104 is illustrated as viewed from the perspective indicated by 2-2 of FIG. 1. In an example, the vibration damper 104 comprises an attachment portion 200 that is configured to be attached to the cable 102. The attachment portion 200 may be located towards a center of the vibration damper 104, and may define a first attachment side 202 and a second attachment side 204. A first portion 203 of the vibration damper 104 may be disposed on the first attachment side 202 of the attachment portion 200, while a second portion 205 of the vibration damper 104 may be disposed on the second attachment side 204 of the attachment portion 200. In an example, the attachment structure 106 can be attached to the attachment portion 200. As such, the attachment structure 106 can extend between the attachment portion 200 and the cable 102, so as to attach the attachment portion 200 of the vibration damper 104 to the cable 102.

Figure 3:
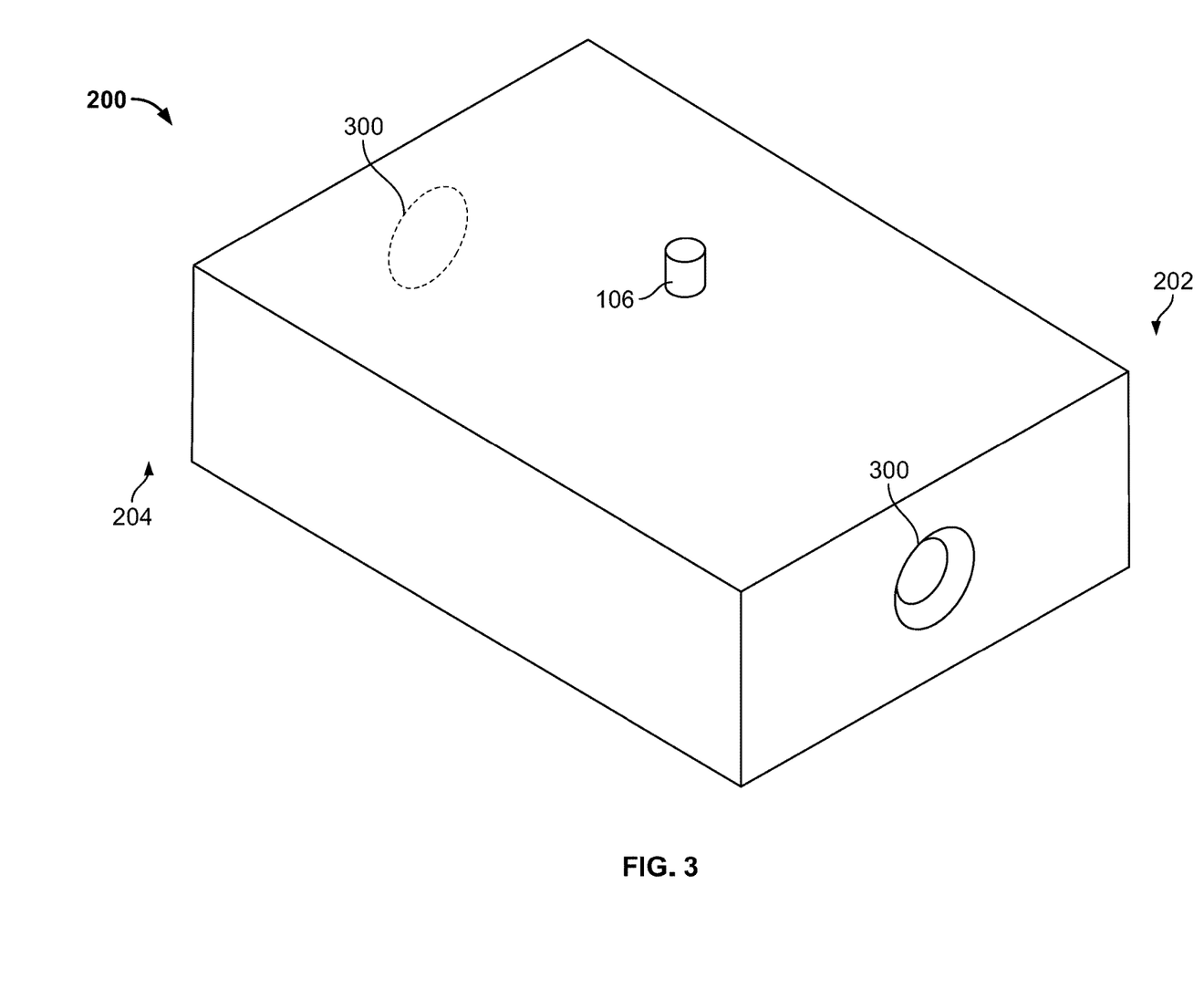
FIG. 3 illustrates a portion of an example damper system.

Referring briefly to FIG. 3, the attachment portion 200 comprises any number of structures. In an example, the attachment portion 200 comprises a cube shaped structure, though other shapes are envisioned. The attachment portion 200 may comprise any number of materials, such as metals, plastics, composites, etc. In this way, the attachment portion 200 may be relatively rigid and/or stiff, so as to resist unintended breaking, fracture, etc.

In an example, the attachment portion 200 comprises one or more openings 300 that may extend partially or completely through the attachment portion 200. For example, the opening(s) 300 may extend between the first attachment side 202 and the second attachment side 204 of the attachment portion 200. In this way, the attachment portion 200 can receive a leg portion (e.g., 209 within the openings 300.

Referring back to FIG. 2, the vibration damper 104 comprises one or more leg portions 209 that may be attached, directly or indirectly, to the attachment portion 200. In an example, the one or more leg portions 209 comprise a leg portion 210, a second leg portion 212, a third leg portion 214, a fourth leg portion 216, a fifth leg portion 218, and a sixth leg portion 220. The one or more leg portions 209 can comprise any number of materials, such as a braided wire, cable, or the like. In an example, the one or more leg portions 209 may have at least some degree of flexibility and/or springiness, such that the one or more leg portions 209 can bend, flex, and/or otherwise move in response to vibration forces.

The leg portion 210 may be disposed on the first attachment side 202 of the attachment portion 200. The leg portion 210 can be attached in any number of ways to the attachment portion 200. For example, a first end 224 of the leg portion 210 can be received within one or more of the openings 300 (e.g., also illustrated in FIG. 3) of the attachment portion 200 while an opposing second end 226 can be spaced a distance apart from the attachment portion 200.

The vibration damper 104 comprises one or more weighted portions 229 that may be attached to the one or more leg portions 209. For example, the one or more weighted portions 229 comprise a weighted portion 230, a second weighted portion 232, a third weighted portion 234, a fourth weighted portion 236, a fifth weighted portion 238, and a sixth weighted portion 240.

Figure 4:
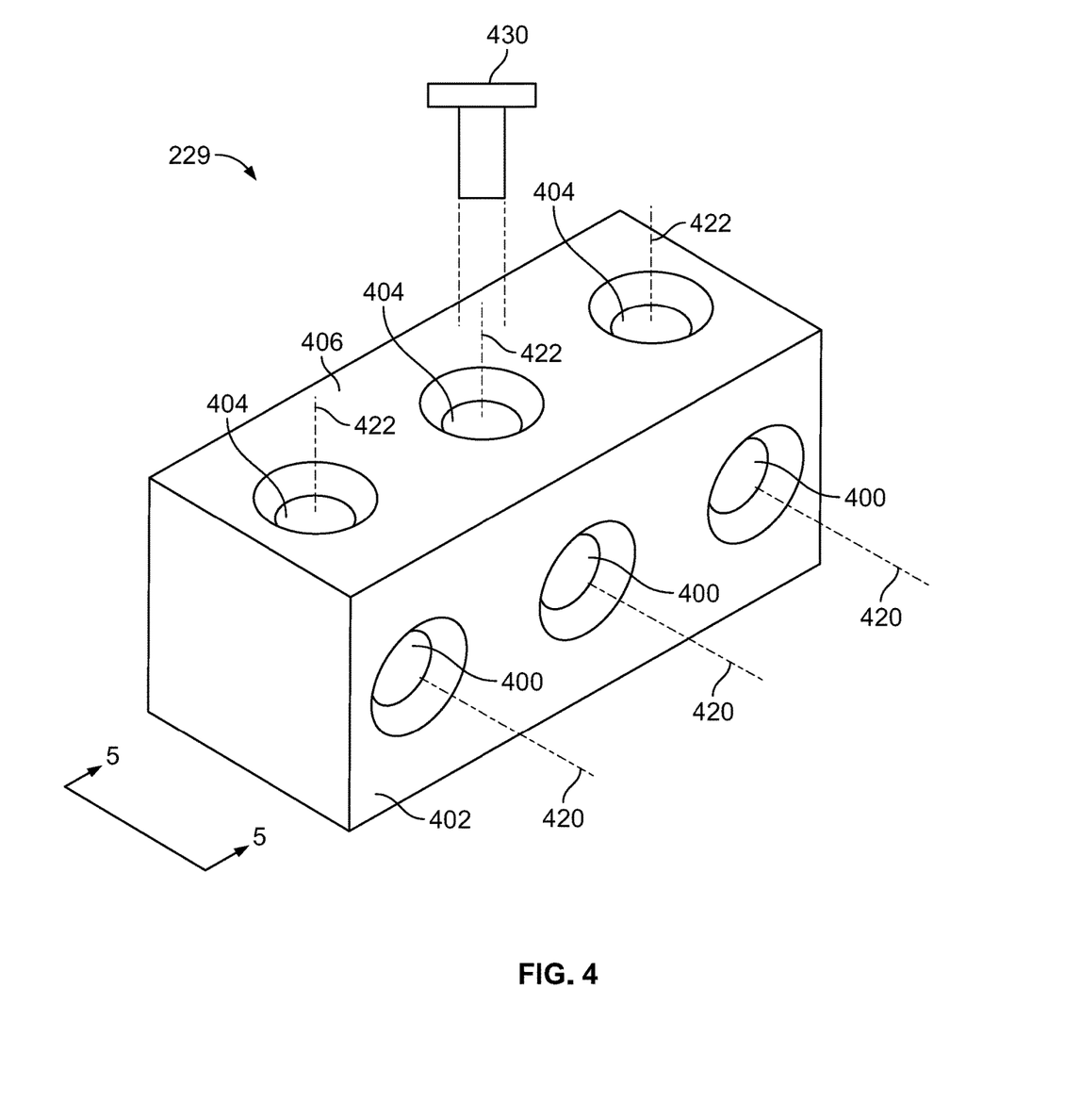
FIG. 4 illustrates a portion of an example damper system.

An example of one of the weighted portions 229 is illustrated in FIG. 4. In an example, the weighted portion 229 comprises a cube shaped structure, though other shapes are envisioned. The weighted portion 229 may comprise any number of materials, such as metals, plastics, composites, etc. In this way, the weighted portion 229 may be relatively rigid and/or stiff, so as to resist unintended deformation. The weighted portion 229 may define one or more first openings 400 that extend at least partially through the weighted portion 229. For example, the first openings 400 may be defined along a first face 402. While the first openings 400 are illustrated as comprising three openings, any number of openings are envisioned. The first openings 400 may be sized/shaped to receive leg portions, as described herein.

The weighted portion 229 may define one or more second openings 404 that extend at least partially through the weighted portion. For example, the second openings 404 may be defined along a second face 406. In an example, the second face 406 may be non-parallel to the first face 402, such as by being perpendicular to the first face 402, as illustrated. In an example, the first openings 400 can extend along first axes 420 while the second openings 404 can extend along second axes 422, with the first axes 420 intersecting the second axes 422. In this way, when the leg portions 209 are received within the first openings 400, the second openings 404 can receive a fastener 430 (e.g., a screw, a bolt, etc.) that can secure the leg portions 209 within the attachment portion 200.

Referring back to FIG. 2, the weighted portion 230 may be attached to the flexible leg portion 210. In an example, the weighted portion 230 may be spaced a distance 242 apart from the attachment portion 200. The weighted portion 230 can have a first side 244 and a second side 246, with the leg portion 210 attached to the first side 244 of the weighted portion 230. In an example, the leg portion 210 can be received within one of the first openings 400 of the weighted portion 229, such as a center opening.

In an example, the second leg portion 212 can be attached to the weighted portion 230. The second leg portion 212 can be attached to the first side 244 of the weighted portion 230, and can extend substantially parallel to the leg portion 210. In an example, the second leg portion 212 may be spaced a second distance 250 apart from the leg portion 210, wherein the second distance 250 is measured along a direction that is substantially perpendicular to the distance 242. The second distance may be less than the distance 242. In an example, a first end 252 of the second leg portion 212 may be attached to the weighted portion 230 while an opposing second end 254 can be spaced a distance apart from the weighted portion 230.

The vibration damper 104 may comprise the second weighted portion 232 that is attached to the second flexible leg portion 212. In an example, the second weighted portion 232 may be attached to the second end 254 of the second leg portion 212. In this way, the second weighted portion 232 may be spaced a third distance 256 apart from the weighted portion 230. In an example, the third distance 256 may be less than the distance 242. The second weighted portion 232 can be disposed on the first side 244 of the weighted portion 230.

In an example, the third leg portion 214 can be attached to the weighted portion 230. The third leg portion 214 can be attached to the second side 246 of the weighted portion 230, and can extend substantially parallel to the leg portion 210 and the second leg portion 212. In an example, the third leg portion 214 may be located on an opposite side of the leg portion 210 from the second leg portion 212. In an example, a first end 258 of the third leg portion 214 may be attached to the weighted portion 230 while an opposing second end 260 can be spaced a distance apart from the weighted portion 230.

The vibration damper 104 may comprise a third weighted portion 234 that is attached to the third flexible leg portion 214. In an example, the third weighted portion 234 may be attached to the second end 260 of the third leg portion 214. In this way, the third weighted portion 234 may be spaced a fourth distance 262 apart from the weighted portion 230. The third weighted portion 234 can be disposed on the second side 246 of the weighted portion 230.

Referring now to the second portion 205 of the vibration damper 104, the fourth leg portion 216 is disposed on the second attachment side 204 of the attachment portion 200. The fourth leg portion 216 can be attached in any number of ways to the attachment portion 200. For example, a first end 266 of the fourth leg portion 216 can be received within one or more of the openings 300 of the attachment portion 200, while an opposing second end 268 can be spaced a distance apart from the attachment portion 200. In an example, the leg portion 210 and the fourth leg portion 216 can extend substantially coaxially, such as along a leg axis, for example.

The fourth weighted portion 236 may be attached to the fourth leg portion 216. In an example, the fourth weighted portion 236 may be spaced a separating distance 270 apart from the attachment portion 200. The fourth weighted portion 236 can have a first side 272 and a second side 274, with the fourth leg portion 216 attached to the first side 272 of the fourth weighted portion 236. In an example, the fourth leg portion 216 can be received within one of the first openings 400 of the fourth weighted portion 236, such as a center opening.

In an example, the fifth leg portion 218 can be attached to the fourth weighted portion 236. The fifth leg portion 218 can be attached to the first side 272 of the fourth weighted portion 236, and can extend substantially parallel to the fourth leg portion 216. In an example, the fifth leg portion 218 may be spaced a second distance 276 apart from the leg portion 210, wherein the second distance 276 is measured along a direction that is substantially perpendicular to the separating distance 270. In an example, a first end 280 of the fifth leg portion 218 may be attached to the fourth weighted portion 236 while an opposing second end 282 can be spaced a distance apart from the fourth weighted portion 236.

The vibration damper 104 may comprise the fifth weighted portion 238 that is attached to the fifth leg portion 218. In an example, the fifth weighted portion 238 may be attached to the second end 282 of the fifth leg portion 218. In this way, the fifth weighted portion 238 may be spaced a third distance 284 apart from the fourth weighted portion 236. In an example, the third distance 284 may be less than the separating distance 270. The fifth weighted portion 238 can be disposed on the first side 272 of the fourth weighted portion 236.

In an example, the sixth leg portion 220 can be attached to the fourth weighted portion 236. The sixth leg portion 220 can be attached to the second side 274 of the fourth weighted portion 236, and can extend substantially parallel to the fourth leg portion 216 and the fifth leg portion 218. In an example, the sixth leg portion 220 may be located on an opposite side of the fourth leg portion 216 from the fifth leg portion 218. In an example, a first end 286 of the sixth leg portion 220 may be attached to the fourth weighted portion 236 while an opposing second end 288 can be spaced a distance apart from the fourth weighted portion 236.

The vibration damper 104 may comprise a sixth weighted portion 240 that is attached to the sixth flexible leg portion 220. In an example, the sixth weighted portion 240 may be attached to the second end 288 of the third leg portion 214. In this way, the sixth weighted portion 240 may be spaced a fourth distance 290 apart from the sixth weighted portion 240. The sixth weighted portion 240 can be disposed on the second side 274 of the fourth weighted portion 236.

Figure 5:
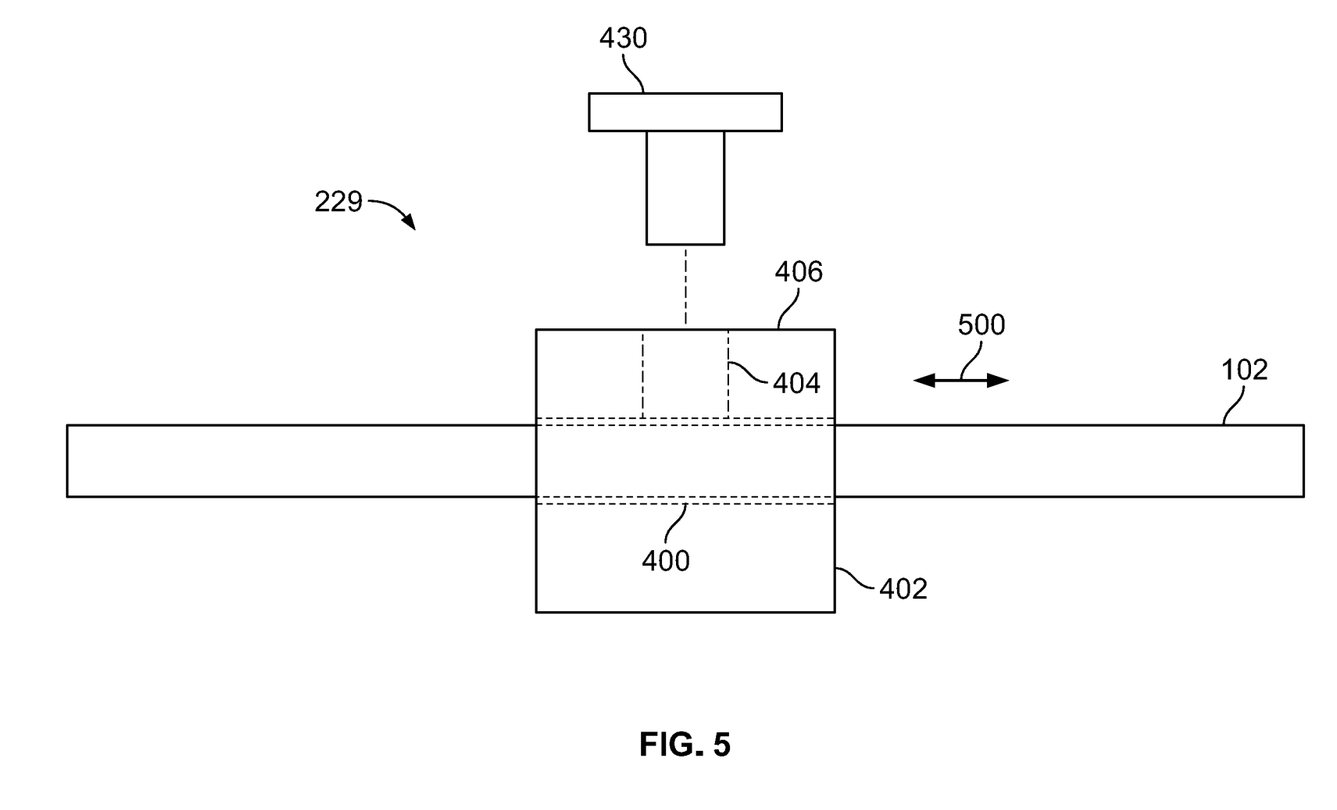
FIG. 5 illustrates a portion of an example damper system.

Referring to FIG. 5, a side view of one of the weighted portions 229 (e.g., 230, 232, 234, 236, 238, 240, etc.) is illustrated as viewed from the perspective indicated by 5-5 of FIG. 4. Initially, the cable 102 can be inserted into the first opening 400, such that the weighted portion 229 can receive the cable 102. In an example, the weighted portion 229 can be adjusted along the cable 102, such as by being moved with respect to the cable 102. For example, the fastener 430 can be removed from the second opening 404. With the fastener 430 removed, the weighted portion 229 can be adjusted and/or moved (e.g., illustrated schematically with movement arrow 500) along the cable 102. In this way, the position of the weighted portion 229 can be adjusted relative to the cable 102.

Figure 6:
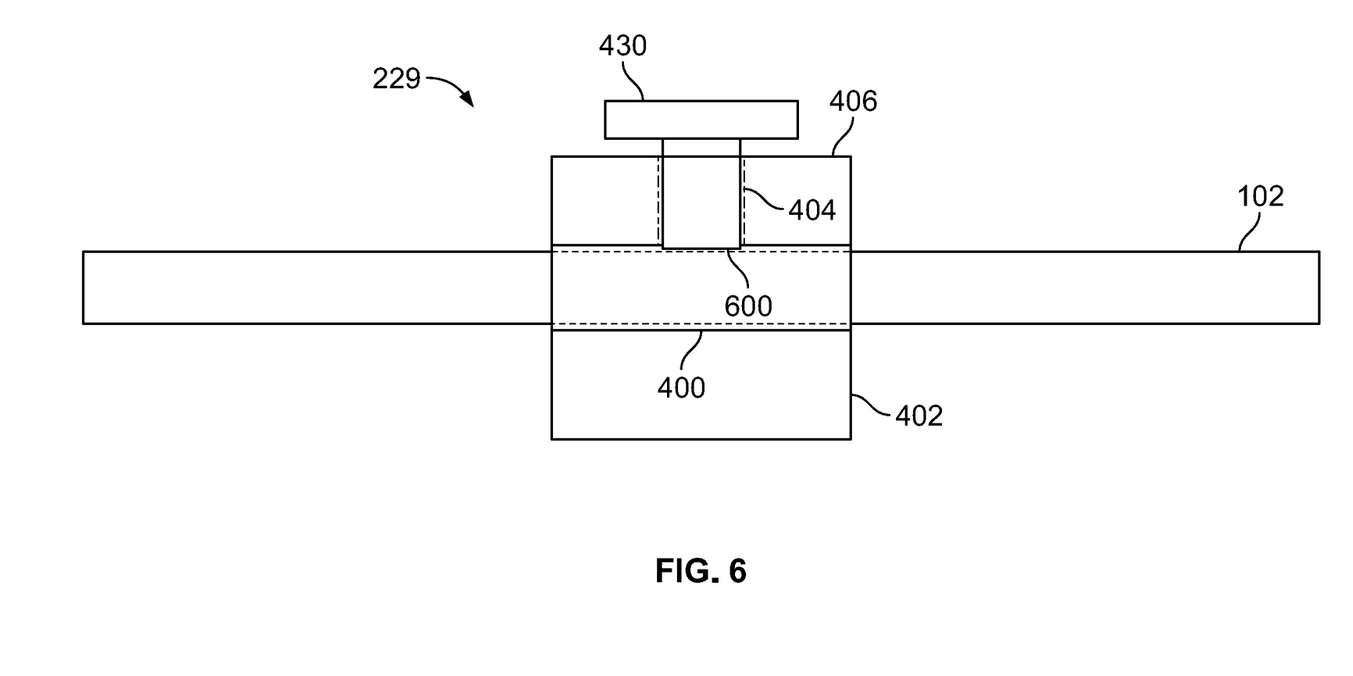
FIG. 6 illustrates a portion of an example damper system.

Referring to FIG. 6, once the weighted portion 229 has been moved and/or adjusted to a desired position relative to the cable 102, the weighted portion 229 can be secured to the cable 102. That is, when the weighted portion 229 is secured to the cable 102, the weighted portion 229 is limited from inadvertent and/or unintended movement relative to the cable 102.

For example, when the weighted portion 229 is in an intended position, the fastener 430 can be inserted into the second opening 404 and tightened. In this way, a fastener end 600 of the fastener 430 can contact and/or engage the cable 102. That is, the fastener end 600 of the fastener 430 can extend into the first opening 400, whereupon the fastener end 600 can apply a force to the cable 102 to limit the cable 102 and/or the weighted portion 229 from moving relative to each other. In an example, the fastener 430 may comprise a threaded fastener that mates and/or engages with a female threading defined by a wall of the second opening 404. As such, once the fastener 430 is tightened into the second opening 404, the fastener 430 is limited from being inadvertently removed from the second opening 404 of the weighted portion 229.

It will be appreciated that the weighted portion 229 is not limited to the structure illustrated in FIGS. 5 and 6. Rather, in an example, the weighted portion 229 may comprise other types of fasteners (e.g., other than 430) and/or other types of methods to be fastened to the cable 102. For example, adhesives, welds, magnets, or the like can be used to secure the cable 102 and the weighted portion 229.

Figure 7:
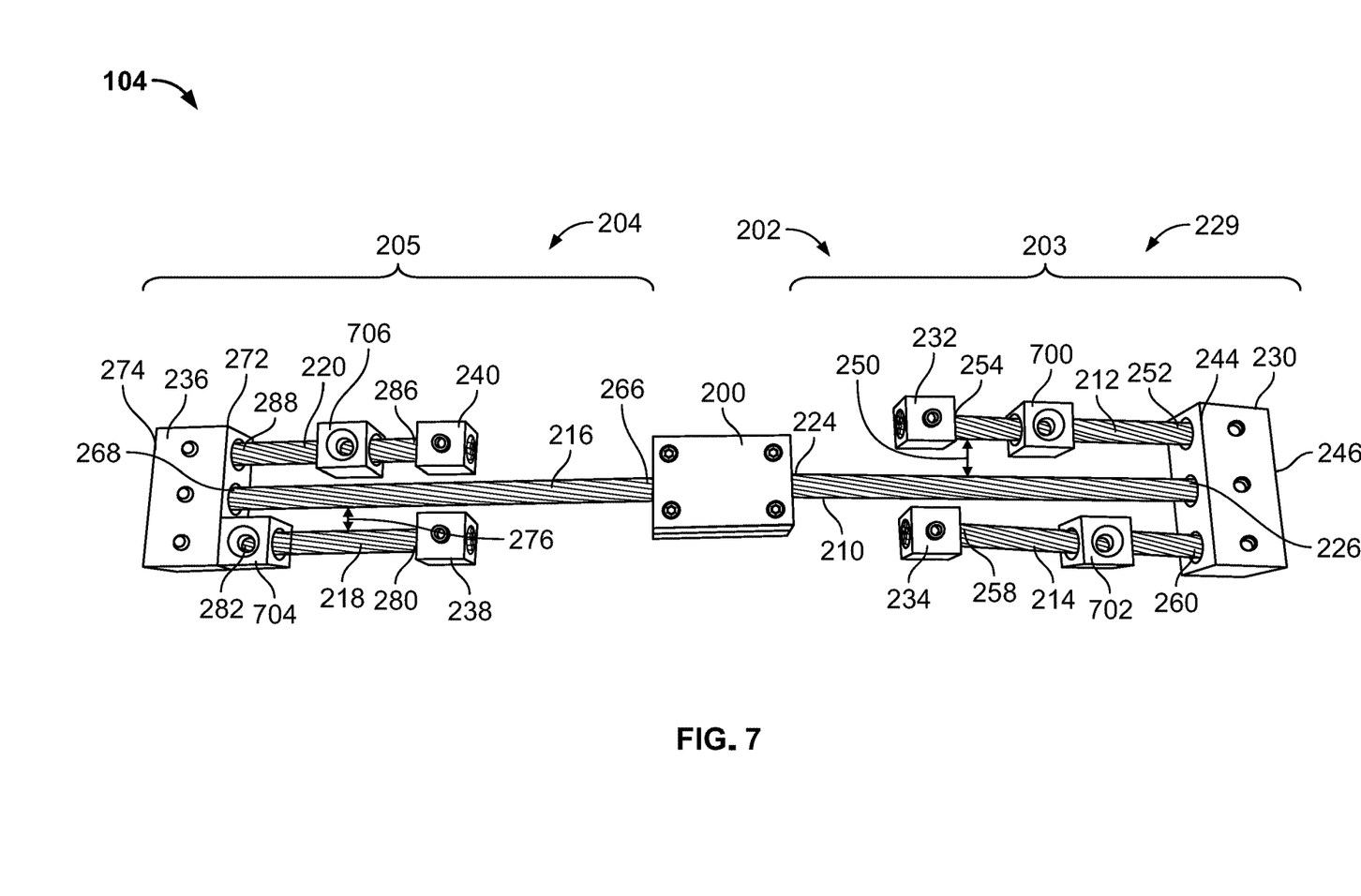
FIG. 7 illustrates an example damper system.

Referring to FIG. 7, an example of the damper system 100 is illustrated. In an example, due to the adjustability between the weighted portions 229 and the flexible leg portions 210, the flexible leg portions 210 and/or the weighted portions 229 can be moved relative to each other. For example, the second leg portion 212 and the third leg portion 214 can be disposed on the first side 244 of the weighted portion 230. In this way, the second leg portion 212 and the third leg portion 214 can extend parallel to each other on opposing sides of the flexible leg portion 210. As such, an axis extending perpendicular to one or more of the flexible leg portion 210, the second leg portion 212, and/or the third leg portion 214 may intersect the flexible leg portion 210, the second leg portion 212, and the third leg portion 214. The second weighted portion 232 and the third weighted portion 234 can be disposed on the same side (e.g., the first side 244) of the weighted portion 230.

In an example, the fifth leg portion 218 and the sixth leg portion 220 can be disposed on the first side 272 of the fourth weighted portion 236. In this way, the fifth leg portion 218 and the sixth leg portion 220 can extend parallel to each other on opposing sides of the fourth flexible leg portion 216. As such, an axis extending perpendicular to one or more of the fourth flexible leg portion 216, the fifth leg portion 218 and/or the sixth leg portion 220 may intersect the fourth flexible leg portion 216, the fifth leg portion 218 and the sixth leg portion 220. The fifth weighted portion 238 and the sixth weighted portion 240 can be disposed on the same side (e.g., the first side 272) of the fourth weighted portion 236.

In an example, the vibration damper 104 is not limited to the illustrated weighted portions of FIG. 2. Rather, in an example, additional weighted portions can be provided. For example, the vibration damper 104 may comprise a seventh weighted portion 700, an eighth weighted portion 702, a ninth weighted portion 704, and/or a tenth weighted portion 706. In an example, the seventh weighted portion 700, the eighth weighted portion 702, the ninth weighted portion 704, and the tenth weighted portion 706 may be similar in structure to the aforementioned weighted portions 229.

The seventh weighted portion 700 may be attached to the second leg portion 212. In an example, the seventh weighted portion 700 may be positioned between the second weighted portion 232 and the weighted portion 230. The seventh weighted portion 700 may be movable along the second leg portion 212, so as to be adjustably positioned in closer proximity to the second weighted portion 232 (e.g., as illustrated) or in closer proximity to the weighted portion 230.

The eighth weighted portion 702 may be attached to the third leg portion 214. In an example, the eighth weighted portion 702 may be positioned between the third weighted portion 234 and the weighted portion 230. The eighth weighted portion 702 may be movable along the third leg portion 214, so as to be adjustably positioned in closer proximity to the third weighted portion 234 or in closer proximity to the weighted portion 230 (e.g., as illustrated).

The ninth weighted portion 704 may be attached to the fifth leg portion 218. In an example, the ninth weighted portion 704 may be positioned between the fifth weighted portion 238 and the fourth weighted portion 236. The ninth weighted portion 704 may be movable along the fifth leg portion 218, so as to be adjustably positioned in closer proximity to the fourth weighted portion 236 (e.g., as illustrated) or in closer proximity to the fifth weighted portion 238.

The tenth weighted portion 706 may be attached to the sixth leg portion 220. In an example, the tenth weighted portion 706 may be positioned between the sixth weighted portion 240 and the fourth weighted portion 236. The tenth weighted portion 706 may be movable along the sixth leg portion 220, so as to be adjustably positioned in closer proximity to the fourth weighted portion 236 or in closer proximity to the sixth weighted portion 240 (e.g., as illustrated).

By providing additional weighted portions to the vibration damper 104, improved vibration damping may be achieved. For example, in certain situations, additional weight may be needed to reduce vibration. In such an example, additional weighted portions can be provided, such as one or more of the seventh weighted portion 700, the eighth weighted portion 702, the ninth weighted portion 704, and/or the tenth weighted portion 706. These weighted portions 700, 702, 704, 706 can be adjusted along the lengths of the respective leg portions to which they are attached. In situations when less weight may be needed, one or more of the weighted portions 700, 702, 704, 706 can be removed. Accordingly, due to the adjustability of the adjustability between the weighted portions and the flexible leg portions, improved vibration damping may be achieved.

Figure 8:
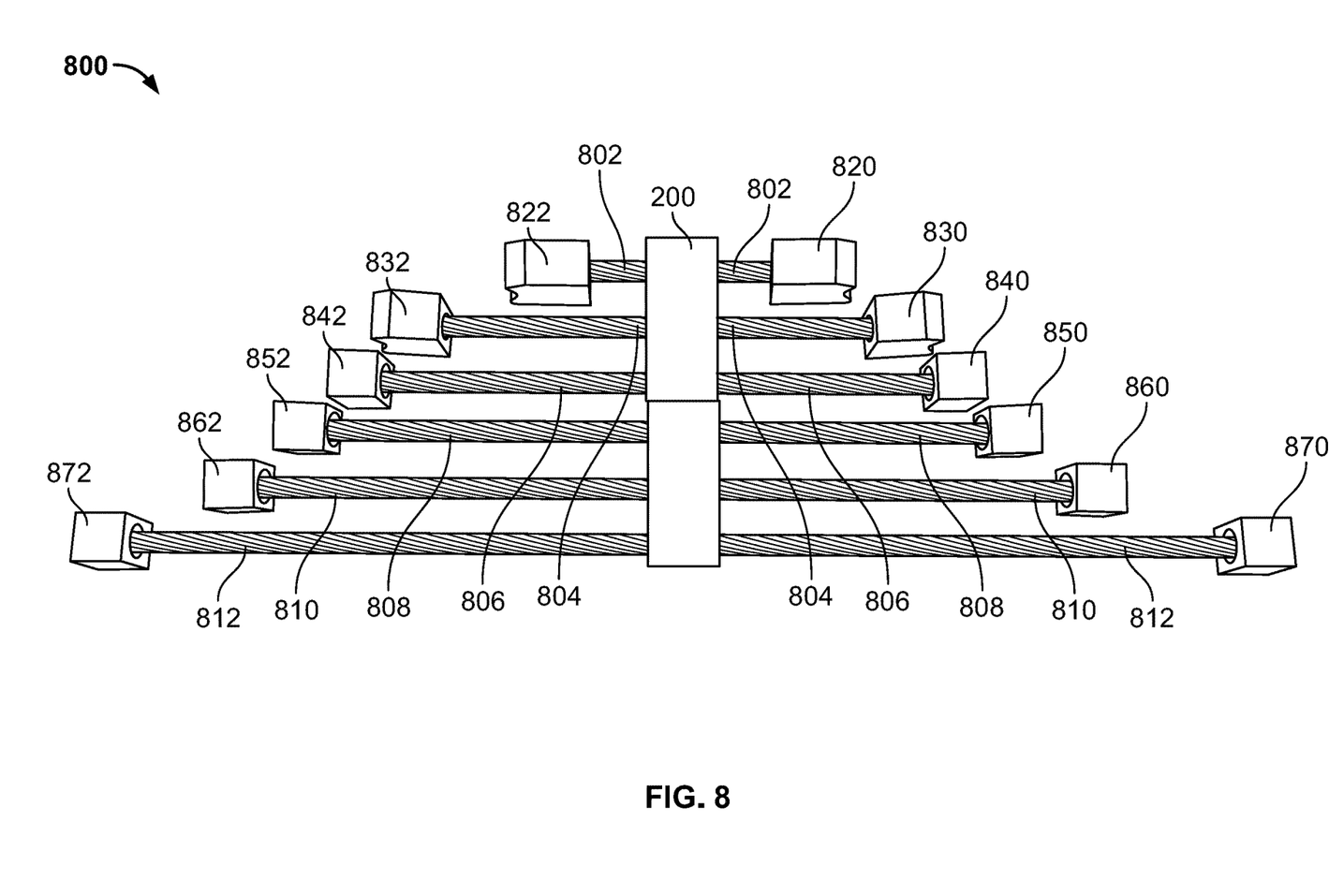
FIG. 8 illustrates an example damper system.

Referring to FIG. 8, an example of a damper system 800 is illustrated. In an example, the damper system 800 may be similar in some respects to the damper system 100 described above. In an example, the damper system 800 comprises the attachment portion 200 with one or more leg portions and weighted portions attached. While any number of leg portions and/or weighted portions may be attached to the attachment portion 200, in an example, the damper system 800 comprises a first leg portion 802, a second leg portion 804, a third leg portion 806, a fourth leg portion 808, a fifth leg portion 810, and a sixth leg portion 812.

In an example, the first leg portion 802 can be located at an end of the attachment portion 200. The second leg portion 804 can be located adjacent to the first leg portion 802 and may have a longer length than the first leg portion 802. The third leg portion 806 can be located adjacent to the second leg portion 804 and may have a longer length than the second leg portion 804. The fourth leg portion 808 can be located adjacent to the third leg portion 806 and may have a longer length than the third leg portion 806. The fifth leg portion 810 can be located adjacent to the fourth leg portion 808 and may have a longer length than the fourth leg portion 808. The sixth leg portion 812 can be located adjacent to the fifth leg portion 810 and may have a longer length than the fifth leg portion 810. In this way, the successive leg portions may have a gradually increasing length from one end of the attachment portion 200 to an opposing end of the attachment portion 200.

In an example, weighted portions may be attached to the leg portions. For example, a first weighted portion 820 and a second weighted portion 822 may be attached to opposing ends of the first leg portion 802. A third weighted portion 830 and a fourth weighted portion 832 may be attached to opposing ends of the second leg portion 804. A fifth weighted portion 840 and a sixth weighted portion 842 may be attached to opposing ends of the third leg portion 806. A seventh weighted portion 850 and an eighth weighted portion 852 may be attached to opposing ends of the fourth leg portion 808. A ninth weighted portion 860 and a tenth weighted portion may be attached to opposing ends of the fifth leg portion 810. An eleventh weighted portion 870 and a twelfth weighted portion 872 may be attached to opposing ends of the sixth leg portion 812. In this way, the arrangement of the weighted portions and the leg portions relative to the attachment portion 200 can assist in reducing vibration of the cable 102.

The damper system 100, 800 that is illustrated and described herein provides a number of benefits. For example, the damper system 100, 800 is a relatively lightweight system that can provide vibration damping to the cable 102. In addition, due to the multiple flexible leg portions and weighted portions that are provided, the damper system 100, 800 can exhibit a wider frequency range to allow for better damping of vibrations. Further, the weighted portions and the leg portions may be adjustable relative to one another. In this way, the damper system 100, 800 can provide for a greater or lesser degree of damping, depending on the situation. Together, these features allow for the damper system 100, 800 to be used in a number of different environments while dissipating vibrations of a wide range of magnitudes that may be experienced by the cable 102.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first cover portion and a second cover portion generally correspond to cover portion A and cover portion B or two different or two identical cover portions or the same cover portion.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A vibration damper for reducing a vibration of a cable, the vibration damper comprising:
   an attachment portion configured to be attached to the cable;
   a flexible leg portion attached to the attachment portion;
   a weighted portion attached to the flexible leg portion, the weighted portion defining a first opening and a second opening; and
   a second flexible leg portion attached to the weighted portion, wherein:
      the first opening extends along a first axis,
      the second opening extends along a second axis,
      the first axis and the second axis lie within a first plane between the cable and a surface above which the cable is suspended,
      the first plane is perpendicular to a second plane that passes through the cable and the first axis,
      the flexible leg portion is received in the first opening for attachment to the weighted portion, and
      the second flexible leg portion is received in the second opening for attachment to the weighted portion.

2. The vibration damper of claim 1, wherein:
   the weighted portion has a first side and a second side,
   the flexible leg portion is attached to the first side of the weighted portion, and
   at least a portion of the second flexible leg portion is attached to the second side of the weighted portion.

3. The vibration damper of claim 1, wherein:
   the weighted portion defines a third opening,
   the second opening is a first distance from the first opening,
   the third opening is a second distance from the first opening, and
   the first distance is equal to the second distance.

4. The vibration damper of claim 1, wherein:
   the weighted portion defines a third opening into which a third flexible leg portion of the vibration damper is received for attachment to the weighted portion.

5. The vibration damper of claim 4, wherein:
   the second opening is a first distance from the first opening,
   the third opening is a second distance from the first opening, and
   the first distance is equal to the second distance.

6. The vibration damper of claim 2, comprising a second weighted portion attached to the portion of the second flexible leg portion.

7. The vibration damper of claim 6, wherein the second weighted portion is movably attached to the portion of the second flexible leg portion.

8. A vibration damper for reducing a vibration of a cable, the vibration damper comprising:
   an attachment portion configured to be attached to the cable;
   a flexible leg portion attached to the attachment portion;
   a weighted portion attached to the flexible leg portion, wherein the flexible leg portion extends from a first side of the weighted portion; and
   a second flexible leg portion attached to the weighted portion, wherein the second flexible leg portion extends from a second side of the weighted portion, wherein:
      the flexible leg portion and the second flexible leg portion lie within a first plane between the cable and a surface above which the cable is suspended, and
      the first plane does not intersect a second plane within which the cable lies.

9. The vibration damper of claim 8, comprising a second weighted portion attached to the second flexible leg portion.

10. The vibration damper of claim 8, comprising a third flexible leg portion attached to the weighted portion.

11. The vibration damper of claim 10, wherein the third flexible leg portion extends from the first side of the weighted portion.

12. The vibration damper of claim 8, wherein:
    the flexible leg portion extends along an axis,
    the second flexible leg portion extends along a second axis, and
    the axis is parallel to the second axis.

13. The vibration damper of claim 10, wherein:
    the flexible leg portion extends along an axis,
    the second flexible leg portion extends along a second axis,
    the third flexible leg portion extends along a third axis,
    the axis is parallel to the second axis, and
    the second axis is parallel to the third axis.

14. The vibration damper of claim 8, wherein:
    the weighted portion defines a first opening and a second opening,
    the first opening extends along a first axis,
    the second opening extends along a second axis,
    the flexible leg portion is received in the first opening for attachment to the weighted portion, and
    the second flexible leg portion is received in the second opening for attachment to the weighted portion.

15. A vibration damper for reducing a vibration of a cable, the vibration damper comprising:
    an attachment portion configured to be attached to the cable;
    a flexible leg portion attached to the attachment portion;
    a weighted portion attached to the flexible leg portion, wherein the flexible leg portion extends from a first side of the weighted portion;
    a second flexible leg portion attached to the weighted portion; and
    a second weighted portion attached to the second flexible leg portion, wherein the second weighted portion is disposed to a second side of the weighted portion, wherein:
       the weighted portion and the second weighted portion lie within a first plane between the cable and a surface above which the cable is suspended, and the first plane does not intersect a second plane within which the cable lies.

16. The vibration damper of claim 15, wherein the second flexible leg portion extends from the second side of the weighted portion.

17. The vibration damper of claim 15, comprising a third flexible leg portion attached to the weighted portion.

18. The vibration damper of claim 15, wherein:
    the flexible leg portion extends along an axis,
    the second flexible leg portion extends along a second axis, and the axis is parallel to the second axis.

19. The vibration damper of claim 17, wherein:
the flexible leg portion extends along an axis,
the second flexible leg portion extends along a second axis,
the third flexible leg portion extends along a third axis,
the axis is parallel to the second axis, and
the second axis is parallel to the third axis.

20. The vibration damper of claim 15, wherein;
the weighted portion defines a first opening and a second opening,
the first opening extends along an axis,
the second opening extends along a second axis,
the flexible leg portion is received in the first opening for attachment to the weighted portion, and
the second flexible leg portion is received in the second opening for attachment to the weighted portion.

\* \* \* \* \*